United States Patent Office 3,413,011
Patented Nov. 26, 1968

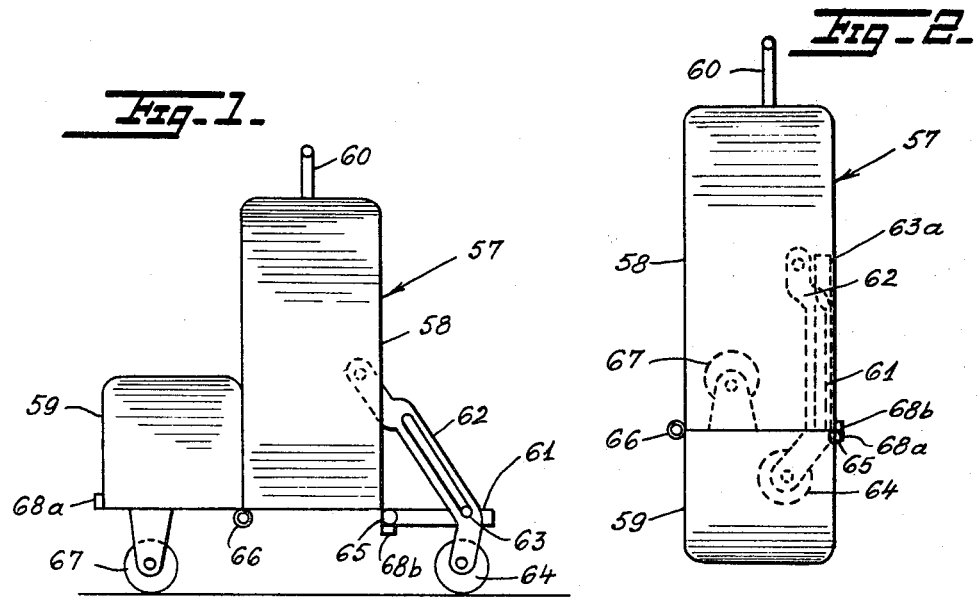

3,413,011
COLLAPSIBLE LUGGAGE SCOOTER
Dorothea M. Weitzner, 8 E. 62nd St.,
New York, N.Y. 10021
Continuation-in-part of application Ser. No. 471,355,
July 12, 1965, now Patent No. 3,314,494. This
application Apr. 11, 1967, Ser. No. 630,136
2 Claims. (Cl. 280—37)

ABSTRACT OF THE DISCLOSURE

A combined luggage scooter and case, the case having top, bottom, front, rear and side walls, platform means adapted to be positioned underneath the bottom wall, caster wheels on said platform means, for transporting the suitcase, and means associated with the platform means to permit the suitcase to be pushed along a supporting surface.

---

This invention relates to a collapsible luggage scooter that can be converted into a suitcase, and this application is a continuation-in-part of my copending application, Ser. No. 471,355, filed July 12, 1965, maturing into Patent 3,314,494.

It is well known that luggage, such as suitcases and sea trunks can become burdensome when it is necessary to carry them over relatively long distances.

This is especially burdensome to the salesman who have to make numerous sales calls and therefore have to carry the samples over relatively long distances in congested streets, or between the roalroad trains and the like.

Therefore, it is a principal object of this invention to provide a case which selectively can be carried by hand or mounted on wheels and towed alongside, the case being provided with a platform which in a perpendicular relationship extends from the suitcase for pushing the suitcase.

Still another object is to provide a compartmented case, wherein the compartments are easily accessible without interference of any scooter component and wherein scooter mechanism is readily accessible for servicing without interfering with the article receiving compartments of the case.

Brief description of the views of the drawings

FIG. 1 is a side elevational view of a combined luggage scooter and case embodying one form of the invention, shown in operative position.

FIG. 2 is a similar view showing the scooter and case collapsed in inoperative position.

Detailed description of the drawings

Referring now in detail to the various views of the drawings, in FIGS. 1 and 2, a sectional travelling luggage scooter and case is shown comprising a case 57 having a bottom hollow upper section 58 and lower hollow section 59 connected together by means of hinges 66. A platform 61 is positioned perpendicular to the case by means of a hinge 65 secured to the upper section 58. Two linkages 62 are slidingly connected to both sides of platform 61 by means of pins 63. Wheels 64 are connected to the bottom portions of linkages 62. The upper portions of the linkages are suitably positioned within the upper section 58 of the case. The upper section features a handle 60. The lower section has a suitably mounted caster wheel 67, which, in conjunction with the wheels 64, provide riding means for the case and the platform.

When the case 57 is folded up, all wheels, the linkage and the platform are located within the case. The wheel 67 is swung into the hollow interior of top or upper section 58, and the platform 61 and linkage 62 into the top section 58 and the wheel 64 into the lower section 59 as shown in FIG. 2. Holding clip 63a is provided to hold the platform 61 and linkage 62 in a vertical position and means 68a, 68b provide a locking device.

While I have illustrated and described the preferred embodiment of my invention, it is to be understood that I do not limit myself to the precise construction herein disclosed and that various changes and modifications may be made within the scope of the invention as defined in the appended claims.

I claim:
1. A combined luggage scooter and case comprising a sectional case having a top hollow section and a bottom hollow end section hinged thereto, the top and bottom sections bounded by top walls, front walls, rear walls, side walls and bottom walls, said bottom end section adapted to be swung into engagement with the front wall of the top section, a handle protruding from the top wall of the top section for transporting the combined scooter and case, a platform hinged to the bottom wall of the top section and normally engaging in vertical position the rear wall of the top section, and wheeled means for supporting the platform and bottom section when said platform and section are in extended position, whereby pressure exerted by the foot of the operator in the proper direction moves the combined scooter and case forwardly, said wheeled means for supporting the bottom section swingable into the top hollow section in collapsed position.

2. A combined luggage scooter as defined in claim 1 wherein said wheeled means includes linkages positioned on each side of the platform and attached to the case midway the top and bottom thereof, wheel means on each side of the platform and connected thereto by means of said linkages said latter wheel means and linkage swingable into the interior of the top and bottom sections in collapsed position.

References Cited

UNITED STATES PATENTS

| 2,463,713 | 3/1949  | Partiot         | 280—37 |
| 2,471,553 | 5/1949  | Zuckerman       | 280—37 |
| 2,577,951 | 12/1951 | Cortsen         | 280—37 |
| 2,925,283 | 2/1960  | Stilger         | 280—37 |
| 3,057,636 | 10/1962 | D'Ettorre et al.| 280—37 |
| 3,178,197 | 4/1965  | Boatner         | 280—37 |
| 2,469,242 | 5/1949  | Pohl            | 280—36 |

BENJAMIN HERSH, *Primary Examiner.*

J. SIEGEL, *Assistant Examiner.*